United States Patent
Masuda et al.

(10) Patent No.: US 7,439,448 B2
(45) Date of Patent: Oct. 21, 2008

(54) PHASE SPLIT STRUCTURE OF MULTIPHASE SUPERCONDUCTING CABLE

(75) Inventors: Takato Masuda, Osaka (JP); Hiroyasu Yumura, Osaka (JP); Yoshihisa Takahashi, Tokyo (JP); Kimiyoshi Matsuo, Tokyo (JP); Shoichi Honjo, Tokyo (JP); Tomoo Mimura, Tokyo (JP)

(73) Assignees: Sumitomo Electric Industries, Ltd., Osaka-shi, Osaka (JP); The Tokyo Electric Power Company Incorporated, Chiyoda-ku, Tokyo (JP)

( * ) Notice: Subject to any disclaimer, the term of this patent is extended or adjusted under 35 U.S.C. 154(b) by 139 days.

(21) Appl. No.: 10/840,334

(22) Filed: May 7, 2004

(65) Prior Publication Data

US 2004/0256142 A1    Dec. 23, 2004

(30) Foreign Application Priority Data

Jun. 19, 2003   (JP)   ............ 2003-174647

(51) Int. Cl.
*H01B 12/00* (2006.01)
(52) U.S. Cl. ................ 174/125.1; 505/230
(58) Field of Classification Search ........... 174/125.1, 174/15.1–15.2; 505/230–232
See application file for complete search history.

(56) References Cited

U.S. PATENT DOCUMENTS

| | | | |
|---|---|---|---|
| 4,161,062 A * | 7/1979 | Agatsuma et al. ........... 29/599 |
| 6,049,036 A | 4/2000 | Metra | |
| 6,448,501 B1 * | 9/2002 | McIntyre et al. ......... 174/125.1 |
| 6,743,984 B2 * | 6/2004 | Nassi et al. .............. 174/125.1 |

FOREIGN PATENT DOCUMENTS

| | | |
|---|---|---|
| CN | 1095232 C | 11/2002 |
| EP | 0780926 A1 | 6/1997 |
| JP | 51-000614 | 1/1976 |
| JP | 58-078728 | 5/1983 |
| JP | 07-015850 A | 1/1995 |
| JP | 09-190847 A | 7/1997 |
| JP | 2003-009330 | 1/2003 |
| JP | 2003-009330 A | 1/2003 |
| WO | WO 00/39811 A1 | 7/2000 |

OTHER PUBLICATIONS

K. Iizuka et al., "Sheath Potential and Sheath Loss of Single-Core Cable and Measures Addressing Them," Power Cable Technology Handbook, New Edition, Mar. 1989, p. 645.
Japanese Office Action and English translation issued Mar. 6, 2008 for Application No. 174647/2003.

* cited by examiner

*Primary Examiner*—Jeremy C. Norris
(74) *Attorney, Agent, or Firm*—Foley & Lardner LLP

(57) ABSTRACT

A phase split structure of a superconducting cable includes three cable cores each having a shield layer provided around a superconductor, a splitter box housing the three cable cores extending from an assembly portion where the three cable cores are assembled into the cable, in a state in which the cable cores are spaced apart from each other, and an electrically-conductive connecting portion connecting respective shield layers of the cable cores to each other within the splitter box. In this way, occurrence of a large magnetic field outside the cable cores can effectively be reduced.

10 Claims, 4 Drawing Sheets

← TO SPLIT TERMINATION    TO ASSEMBLY PORTION →

PHASE SPLIT STRUCTURE OF MULTIPHASE SUPERCONDUCTING CABLE

BACKGROUND OF THE INVENTION

1. Field of the Invention

The present invention relates to a split structure for splitting a multiphase superconducting cable constructed of a plurality of cable cores into respective segments containing the cores. In particular, the present invention relates to a phase split structure of a multiphase superconducting cable to minimize or nullify a magnetic field that could be generated outside each cable core.

2. Description of the Background Art

As one of superconducting cables that have been produced using a superconductor formed of a Bi-based high-temperature superconducting tape for example, a multiphase superconducting cable of multicore type that is produced by assembling a plurality of cable cores into one unit is under development.

Referring to FIG. 4, this superconducting cable 100 includes three cable cores 102 twisted and housed in a thermal insulation pipe 101. Thermal insulation pipe 101 has an outer pipe 101a and an inner pipe 101b. This double pipe constructed of these outer pipe 101a and inner pipe 101b has a thermal insulation material (not shown) provided therein and a vacuum is produced within the double pipe. These cable cores 102 each include, in the order starting from the innermost component, a former 200, a superconductor 201, an electrical insulation layer 202, a shield layer 203, and a protection layer 204. Superconductor 201 is constructed by winding superconducting wires around former 200 in a spiral manner in layers. Shield layer 203 is constructed by winding superconducting wires similar to that of superconductor 201 around electrical insulation layer 202 in a spiral manner. In this shield layer 203, in a steady state, current is induced of almost the same magnitude as and opposite in direction to current flowing through superconductor 201. The induced current causes a magnetic field to be generated that cancels out a magnetic field generated from superconductor 201 to achieve almost zero leakage magnetic field outside cable core 102. A space 103 formed between inner pipe 101b and each cable core 102 usually provides a path where a refrigerant flows. An anticorrosion layer 104 of polyvinyl chloride is provided around thermal insulation pipe 101.

In a case for example where a plurality of multiphase superconducting cables are connected to each other, a multiphase superconducting cable is connected to a normal-conducting cable, or a termination structure of a multiphase superconducting cable is formed, the multiphase superconducting cable is split into respective segments of respective phases, namely cable cores. The cable is split into the cable-core segments in a splitter box kept at a cryogenic temperature and the cable cores are held within the splitter box in a state where the cable cores are spaced apart from each other. A jig for holding cables with sufficient spaces therebetween is disclosed for example in Japanese Patent Laying-Open No. 2003-009330.

In another case for example where a plurality of multiphase normal-conducting cables are connected to each other or a termination structure of a multiphase normal-conducting cable is formed, the multiphase normal-conducting cable is also split into respective segments of the cable cores as done for the multiphase superconducting cable. Here, the normal-conducting cable is split into the cable-core segments without the above-described splitter box and thus the cable cores are spaced apart as they are. At the splitting portion of the cable, the shield layer of each cable core is usually grounded in order to obtain a ground potential for each phase. This technique is described for example in "Power Cable Technology Handbook, New Edition" by Kihachiro Iizuka, Kabushiki Kaisha Denkishoin, Mar. 25, 1989, first edition, first copy, p. 645.

As for the multiphase superconducting cable, however, it has not been known or devised how to process the shield layer of each cable core at the splitting portion and thus there is a demand for a specific method of appropriately processing the shield layer. The shield layer of each cable core at the splitting portion of the superconducting cable may be grounded like that of the normal-conducting cable as discussed above. The superconducting cable, however, allows significantly larger current to flow as compared with the normal-conducting cable, so that respective shield layers of the cable cores could be connected through the ground if the shield layers are grounded as those of the normal-conducting cable. If respective shield layers of the cable cores of the superconducting cable are separately grounded and the shield layers are connected through the ground, smaller current consequently flows through the shield layer than that through the superconductor due to a high electrical connection resistance between the shield layers. A resultant problem is that the shield layer of each cable core cannot produce a magnetic field large enough to cancel out the magnetic field generated from the superconductor of each core and, a large magnetic field could be generated outside each core.

SUMMARY OF THE INVENTION

An object of the present invention is to provide a phase split structure of a multiphase superconducting cable to minimize or nullify a magnetic field that could be generated outside a plurality of cable cores.

The present invention achieves the above-described object by connecting respective shield layers of a plurality of cable cores to each other with an electrically-conductive material in such a manner that the shield layers are connected to each other with a low resistance.

Specifically, a phase split structure of a multiphase superconducting cable of the present invention includes a plurality of cable cores having respective shield layers provided around respective superconductors, a splitter box housing the cable cores each extending from an assembly portion in which the cable cores are assembled, the cable cores in the splitter box being spaced apart from each other, and an electrically-conductive connecting portion connecting respective shield layers of the cable cores to each other in the splitter box.

If respective shield layers of the cable cores of the multiphase superconducting cable are connected to each other via the ground, the connection resistance between the shield layers is high. In such a case, there arises a difficulty in generating a magnetic field by each of respective shield layers of the cable cores that can cancel out a magnetic field generated from the superconductor of each cable core. The present invention thus connects respective shield layers of the cable cores to each other with an electrically-conductive member having a lower connection resistance instead of connecting the shield layers via the ground which results in a high connection resistance.

The present invention is now described in more detail.

The present invention is directed to a multiphase superconducting cable having a plurality of cable cores with respective shield layers around respective superconductors. For example, the present invention is directed to a three-phase superconducting cable of three-core type having three cable cores twisted and housed in a thermal insulation pipe. The superconducting cable of the present invention may be any of known multiphase superconducting cables.

The present invention uses a splitter box for housing cable-core segments of the multiphase superconducting cable that are formed by splitting the superconducting cable into respective segments containing the cable cores. Specifically, in the splitter box, cable cores extending from an assembly portion and spaced apart from each other are housed. Here, the assembly portion refers to a portion of the multiphase superconducting cable in which a plurality of cable cores constituting the superconducting cable are assembled into the cable. The splitter box is filled with such a refrigerant as liquid nitrogen for cooling the cable cores so that the cable cores are kept in a superconducting state. Therefore, the splitter box is preferably of a thermal insulation structure.

The cable cores each in the splitter box may be held by means of a holding tool. An example of the holding tool is capable of holding each of the cable cores and capable of holding the cable cores in a state where the cable cores are spaced apart from each other. In particular, the holding tool is preferably structured to be able to move within the splitter box as the cable cores extend/contract.

According to the present invention, respective shield layers of the cable cores housed in the splitter box are connected to each other by means of a particular connecting portion, specifically, an electrically-conductive connecting portion formed of an electrically-conductive material. The electrically-conductive material is preferably such a material as copper or aluminum (both having a specific resistance at 77K: $\rho=2\times10^{-7}$ $\Omega\cdot cm$). These metals each have an electrical resistance which is low even at a temperature close to the temperature of a refrigerant of the superconducting cable, for example, the temperature of liquid nitrogen if it is used as the refrigerant. The conductive connecting portion may connect at least respective parts, with respect to the longitudinal direction, of respective shield layers of the cable cores housed in the splitter box. The connecting portion may be shaped in a manner that the connecting portion contacts at least respective parts, with respect to the circumferential direction, of respective shield layers of the cable cores and can connect respective shield layers of the cable cores to each other. If respective shield layers of the cable cores are each formed of a plurality of superconducting strands, the connecting portion is preferably shaped in such a manner that the connecting portion can be electrically connected to all of the constituent superconducting strands. For example, the connecting portion is shaped to have a combination of cylindrical members each capable of covering the periphery of each of respective shield layers of the cable cores and coupling members coupling the cylindrical members to each other. In particular, the coupling member is preferably a flexible member. More specifically, the coupling member is formed of a braided material. The flexible coupling member can be used to accommodate to any movement of each core that occurs upon contraction caused by cooling. The flexibility of the coupling member provides excellent workability in terms of assembly in a limited space like the inside of the splitter box and can absorb any dimensional error resultant from the assembly work.

Preferably, the electrically-conductive connecting portion and the shield layers are connected with a lower electrical resistance upon the connection. For example, they are appropriately connected with solder. When the conductive connecting portion is attached to the shield layer, a protection layer, if provided to each cable core, is partially removed in advance in such a way that removes a part of the protection layer where the connection is effected.

The electrically-conductive connecting portion may be attached to the shield layers of the cable cores drawn out of the splitter box. Here, the cable cores extended out of the splitter box are each provided with a thermal insulation pipe filled with such a refrigerant as liquid nitrogen in order to maintain a superconducting state like that of the cable cores housed in the splitter box. Therefore, the structure of connecting the conductive connecting portion to each of respective shield layers of the cable cores extended out of the splitter box is extremely complicated and thus the present invention attaches the conductive connecting portion to the cores within the splitter box.

The conductive connecting portion may be provided at an arbitrary position of each of the cable cores within the splitter box. If the conductive connecting portion is provided at a position relatively closer to the termination of the split cable (hereinafter split termination), the cable cores are spaced further apart from each other and thus the distances between the cable cores increase. In such a case, the workability in attaching the connecting portion is improved and thus this method is preferable. In contrast, if the conductive connecting portion is provided at a position relatively closer to the assembly portion, the cable cores are not substantially spaced further apart and thus the distances therebetween are smaller. In this case, the conductive connecting portion can be made compact and the part of the splitter box that is located closer to the split termination can be made smaller since the connecting portion is located away from the split termination. In other words, the splitter box can be made more compact.

Preferably, the split structure of the present invention is formed not only at one end of the cable cores (superconducting cable) but at each of both ends thereof. If split structures of the present invention are provided at respective ends of the superconducting cable, respective shield layers of the cable cores in each of respective splitter boxes at respective ends of the cable are connected to each other with the conductive connecting portion. Then, in each of respective shield layers of the cable cores extending from the conductive connecting portion at one end of the superconducting cable to the conductive connecting portion at the other end thereof, current of almost the same magnitude as and opposite in direction to current flowing in a corresponding superconductor is induced in a steady state and thus any leakage magnetic field outside the cores can be cancelled out. Most of the current of almost the same magnitude as and opposite in direction to the current flowing through the superconductor flows in a part of the shield layer that is located closer to the assembly portion with respect to the conductive connecting portion. Therefore, in a part of the shield layer that is located between the conductive connecting portion and the split termination, current smaller than that flowing through the superconductor merely flows. Then, if the above-mentioned thermal insulation pipe provided around each of the cable cores extended out of the splitter box is made of an electrically-low-resistance material, an eddy-current loss could occur due to a leakage magnetic field generated around the cable cores located between the conductive connecting portion and the split termination. Then, in order to reduce or nullify the eddy current loss, the thermal insulation pipe is preferably formed of a high-resistance material or insulation material. The high-resistance material preferably has a specific resistance $\rho$ from a room temperature to a low temperature of approximately 77 K is at least $10^{-5}$ $\Omega\cdot cm$. An example of the high-resistance material is stainless (specific resistance $\rho = 4 \times 10^{-5}$ $\Omega \cdot cm$ to $8 \times 10^{-5}$ $\Omega \cdot cm$). An example of the insulation material is FRP (Fiber Reinforced Plastics).

Respective shield layers of the cable cores are each grounded. Here, the shield layers are preferably grounded all together for improvement of workability. Thus, the present invention grounds the conductive connecting portion which connects the shield layers to each other so as to ground the shield layers all together. If the split structures of the present invention are provided at both ends of the superconducting cable and both of the conductive connecting portions at respective ends are grounded, a closed loop could be formed via the ground. Therefore, only the conductive connecting portion in the splitter box at one of the ends is grounded.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described.

First Embodiment

Figure 1:
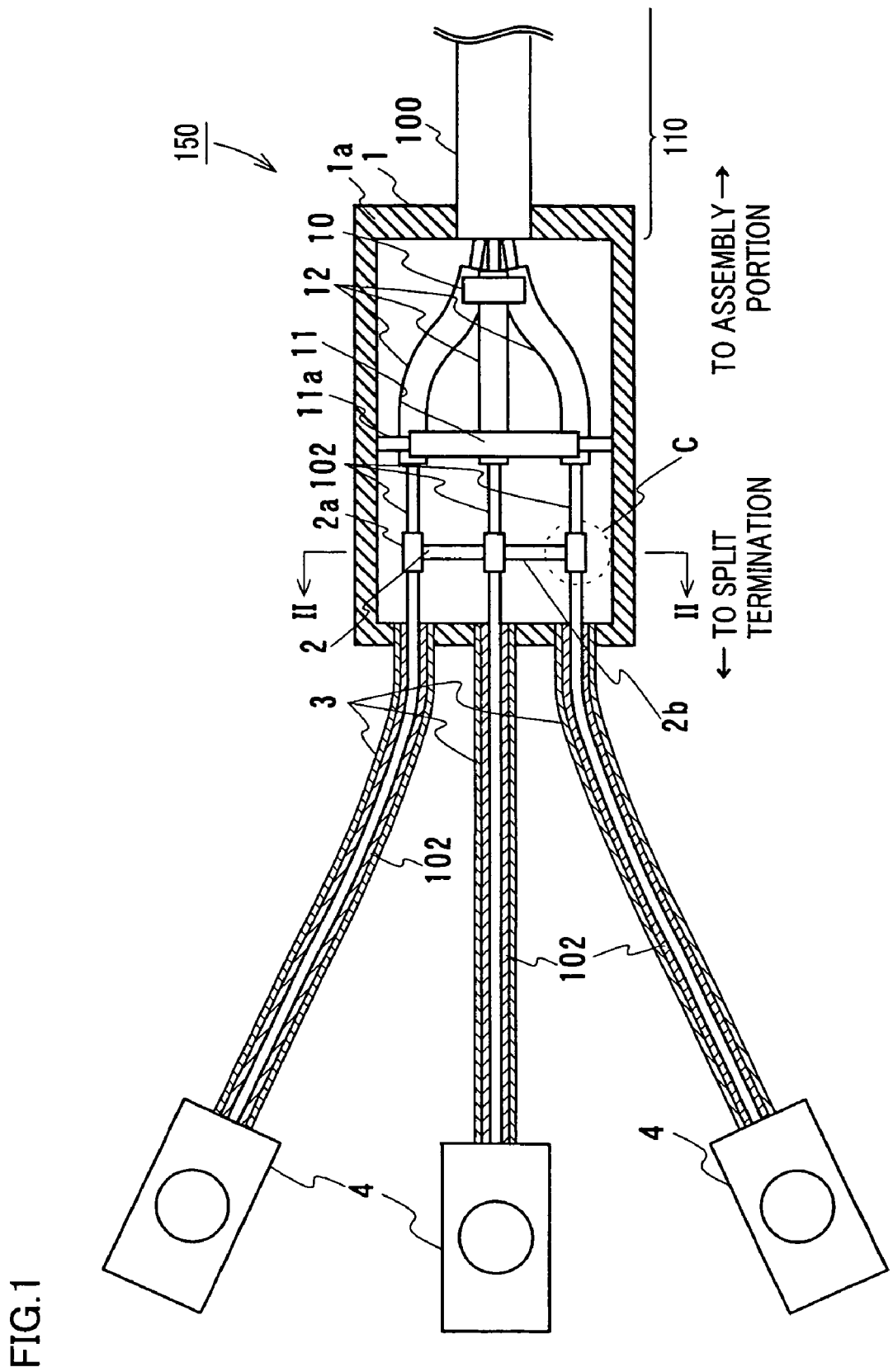
FIG. 1 schematically shows a phase split structure of a multiphase superconducting cable of the present invention that has an electrically-conductive connecting portion located relatively closer to a split termination.

This embodiment is described in connection with an example of a phase split structure of a three-phase superconducting cable 100 having three cable cores 102 as shown in FIG. 1.

Referring to FIG. 1, a phase split structure 150 of the multiphase superconducting cable of this embodiment includes three cable cores 102 each having a shield layer provided around a superconductor, a splitter box 1 housing cable cores 102 in a state in which cable cores 102 extending from an assembly portion 110 where three cable cores 102 are assembled into the superconducting cable are spaced apart from each other, and an electrically-conductive connecting portion 2 connecting respective shield layers of cable cores 102 to each other in splitter box 1.

Figure 4:
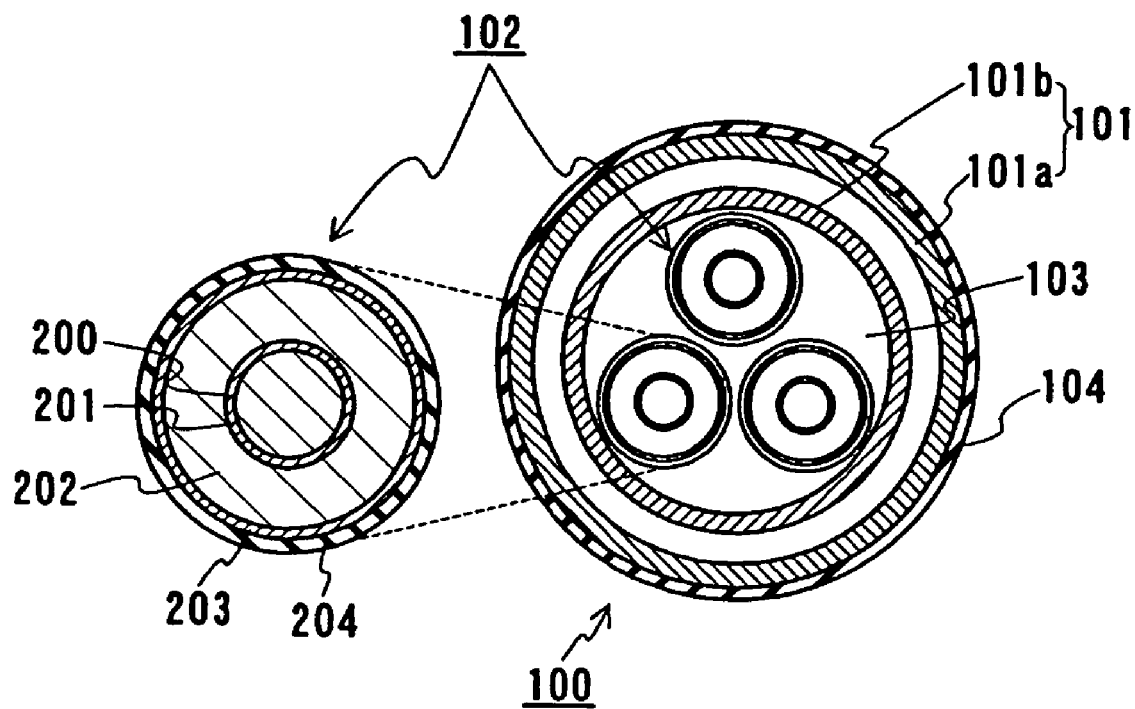
FIG. 4 is a cross-sectional view of a three-phase superconducting cable of three-core type.

Three-phase superconducting cable 100 of this embodiment has the same structure as that shown in FIG. 4. Specifically, referring to FIG. 4, three-phase superconducting cable 100 is structured by twisting three cable cores 102 and housing them in thermal insulation pipe 101, the cable cores each including, in the order starting from the innermost component, former 200, superconductor 201, electrical insulation layer 202, shield layer 203 and protection layer 204. Former 200 is constructed by twisting a plurality of copper wires each coated with an insulator. Superconductor 201 is constructed by winding in spiral manner Bi2223-based superconducting tape-shaped wires (Ag—Mn sheath wires) in layers around former 200. Shield layer 203 is constructed by winding in spiral manner Bi2223-based superconducting tape-shaped wires (Ag—Mn sheath wires) in layers around electrical insulation layer 202. Electrical insulation layer 202 is constructed by winding polypropylene laminated paper (PPLP (R) manufactured by Sumitomo Electric Industries, Ltd.) around superconductor 201. Protection layer 204 is constructed by winding kraft paper around shield layer 203. Thermal insulation pipe 101 has outer pipe 101a and inner pipe 101b each formed of an SUS corrugated pipe. The double pipe constituted of outer pipe 101a and inner pipe 101b has a thermal insulation material therein provided in layers and a vacuum is produced within the double pipe to accomplish a vacuum multilayer thermal insulation structure. Further, anticorrosion layer 104 of polyvinyl chloride is provided around thermal insulation pipe 101.

Referring again to FIG. 1, three-phase superconducting cable 100 having twisted cable cores 102 assembled thereinto is split into respective segments of cable cores 102 by spacing cable cores 102 apart from each other so that cable cores 102 are handled separately. Splitter box 1 houses these three cable cores 102 spaced gradually apart from each other. Thus, superconducting cable 100 is inserted from one side of splitter box 1 (the right side in FIG. 1) and, from the other side thereof (the left side in FIG. 1) opposite to that one side, cable cores 102 split from the cable protrude. The inside of splitter box 1 is filled with such a refrigerant as liquid nitrogen for cooling cable cores 102 having refrigerant therein. Splitter box 1 thus has a thermal insulation structure with a thermal insulation layer 1a. Splitter box 1 of this embodiment is cylindrical in shape.

Cable cores 102 housed in splitter box 1 extend from one side of splitter box 1 (from assembly portion 110 of superconducting cable 100) toward the other side of splitter box 1 (toward split termination of cores 102) with spaces between cores 102 that gradually increase to become constant. Cable cores 102 of this embodiment are held by a first holding tool 10 holding the cores at a position relatively closer to assembly portion 110, a second holding tool 11 holding the cores at a middle position, and intermediate holding tools 12 holding cores 102 between first holding tool 10 and second holding tool 11.

First holding tool 10 has an annular central portion and three intermediate holding tools 12 are fixed to the outer periphery of the annular portion. First holding tool 10 is provided between cable cores 102 in such a manner that the center of the annular portion is substantially located at the center of the space enclosed by three cable cores 102. Cable cores 102 are provided at respective intermediate holding tools 12 so that intermediate holding tools 12 hold cable cores 102 spaced apart from each other.

The basic structure of second holding tool 11 is almost similar to that of first holding tool 10 and different therefrom only in that the diameter of the annular portion is made larger than that of first holding tool 10. In this embodiment, a sliding portion 11a is provided that is substantially in point contact with the inner peripheral surface of splitter box 1 so as to be movable in splitter box 1 as cable cores 102 extend/contract. Sliding portion 11a is attached to any part on the outer periphery of the annular portion where intermediate holding tools 12 are not fixed. Cable cores 102 are held by second holding tool 11 in such a manner that cable cores 102 extend within splitter box 1 toward terminal portions 4 while spaces between respective cores become constant. It is noted that "closer to the split termination" herein refers to a portion located closer to terminal portions 4 with respect to second holding tool 11. Further, "closer to the assembly portion" herein refers to a portion located closer to assembly portion 110 with respect to second holding tool 11.

Intermediate holding tools 12 are each cylindrical in shape constructed by combining semi-arc members, namely so-called canaliculate members. In this embodiment, paired canaliculate members cover the outer periphery of cable core 102 and the outer periphery of the canaliculate members is attached to the outer periphery of cable core 102 with some tightening tool like a band (not shown) to hold cable core 102 therein. Intermediate holding tool 12 may have some through holes appropriately provided therein to facilitate contact between cable core 102 in intermediate holding tool 12 and the refrigerant.

Figure 2A:
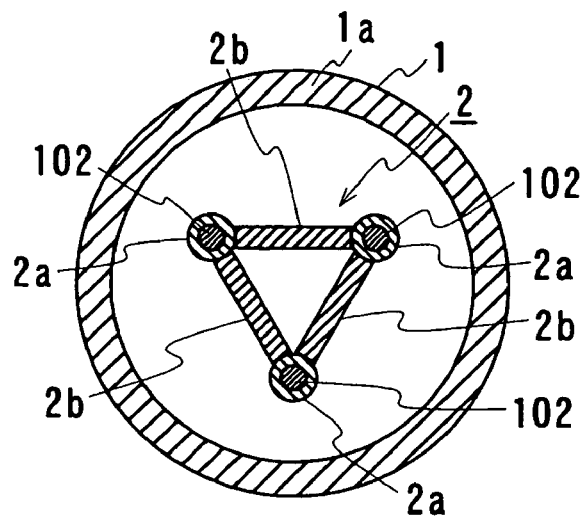
FIG. 2A is a cross-sectional view along line II-II in FIG. 1.
Figure 2B:
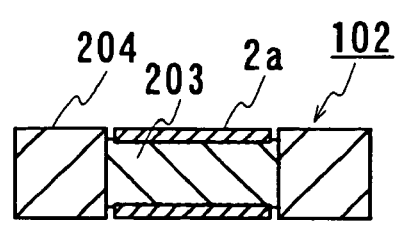
FIG. 2B is a cross-sectional view of a part of a cable core that is in region C shown in FIG. 1.

A feature of this embodiment is in the structure connecting respective shield layers of cable cores 102 to each other with electrically-conductive connecting portion 2. In this embodiment, respective shield layers of cable cores 102 located relatively closer to the split termination with respect to second holding tool 11 are connected to each other by conductive connecting portion 2. Referring to FIGS. 2A and 2B, conductive connecting portion 2 of this embodiment includes cylindrical members 2a covering respective outer peripheries of shield layers 203 of cable cores 102 and coupling members 2b coupling cylindrical members 2a to each other.

Cylindrical members 2a are each constructed of a pair of semi-arc members matching in shape to the outer shape of cable core 102 so that attachment of cylindrical member 2a to the outer periphery of shield layer 203 of each cable core 102 is facilitated. The semi-arc members are thus combined to cover the outer periphery of shield layer 203. More specifically, as shown in FIG. 2B, protection layer 204 of cable core 102 is partially removed to partially expose shield layer 203, and the paired semi-arc members are provided over the exposed part of shield layer 203 to cover cable core 102. Cylindrical members 2a are made of copper. Although the paired semi-arc members are connected with solder, they may be connected by means of such coupling members as bolts. In addition, each cylindrical member 2a and shield layer 203 of cable core 102 are also connected with solder. Cylindrical member 2a is thus brought into contact with superconducting tape-shaped wires constituting shield layer 203.

Figure 2C:
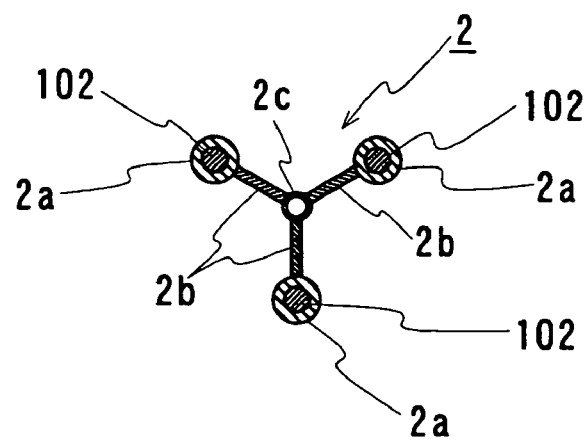
FIG. 2C is a cross-sectional view of an electrically-conductive connecting portion of another form.

Coupling members 2b connect cylindrical members 2a to each other and are provided between cable cores 102 to hold cable cores 102 in the state in which cable cores 102 are spaced apart from each other. In this embodiment, coupling members 2b are each formed of a braided material of copper as cylindrical members 2b. Flexible coupling members 2b can be used to follow any movement of each cable core that could occur upon contraction caused by cooling and to facilitate connection to cylindrical members 2a within splitter box 1. Moreover, any error occurring in the connecting work can be absorbed. In this embodiment, three coupling members 2b are employed, cylindrical members 2a are connected to respective ends of each coupling member 2b, and accordingly conductive connecting portion 2 is formed as shown in FIG. 2A in the shape of a triangle with cylindrical members 2a at respective apexes (Δ connection type). In this embodiment, coupling members 2b and cylindrical members 2a are connected with solder. Alternatively, they may be connected by means of such coupling members as bolts. Further, as shown in FIG. 2C, conductive connecting portion 2 may be constructed to have a central member 2c provided at the center of a triangle with cylindrical members 2a at respective apexes and have coupling members 2b connecting central member 2c to respective cylindrical members 2a (Y connection type).

According to this embodiment, thermal insulation pipe 3 is provided around each cable core 102 drawn from splitter box 1, thermal insulation pipe 3 is constructed of a double stainless corrugated pipe, and thermal insulation pipe 3 is filled with a refrigerant as splitter box 1. Thus, cable cores 102 each extending from splitter box 1 can be kept in the superconducting state. The split termination of each cable core 102 is provided with terminal portion 4 connectable to another cable core or connection equipment. The above-described features are also of a second embodiment hereinlater described.

Phase split structure 150 of the superconducting cable constructed as described above has electrically-conductive connecting portion 2 connecting respective shield layers 203 of cable cores 102, so that these shield layers 203 are short-circuited to each other when current flows through the cable. Specifically, since shield layers 203 are connected with a low connection resistance therebetween, the magnitude of current flowing through each shield layer 203 can be made substantially equal to that of current flowing through superconductors 201 each. A magnetic field can thus be generated in each of shield layers 203 that can cancel out a magnetic field generated from each of superconductors 201 and accordingly generation of a large magnetic field outside cable cores 102 can be reduced.

Further, according to this embodiment, electrically-conductive connecting portion 2 is attached at a location relatively closer to the split termination, so that conductive connecting portion 2 can easily be attached at the location where cable cores 102 are sufficiently spaced apart from each other. Moreover, in this embodiment, thermal insulation pipe 3 provided around each of cable cores 102 extended from splitter box 1 is made of a high-resistance material, so that occurrence of eddy current can be reduced or minimized even when a leakage magnetic field is generated around cable cores 102 at the section between conductive connecting portion 2 and the termination (see FIG. 1). In this way, any loss due to the eddy current can be reduced.

Phase split structure 150 of the superconducting cable in this embodiment is provided at each of respective ends of superconducting cable 100. Only the conductive connecting portion 2 of splitter box 1 at one of the ends of the cable is grounded. Specifically, a ground wire is attached to conductive connecting portion 2 with solder for example and this ground wire is drawn to the outside of splitter box 1 and grounded. The ground wire and splitter box 1 are hermetically sealed to keep air-tightness. Conductive connecting portion 2 connecting respective shield layers of cable cores 102 to each other is thus grounded so that the shield layers can collectively be grounded. In addition, as only the conductive connecting portion 2 at one of the ends of the cable is grounded, none of shield layers of cable cores 102 is connected via the ground.

Second Embodiment

Figure 3A:
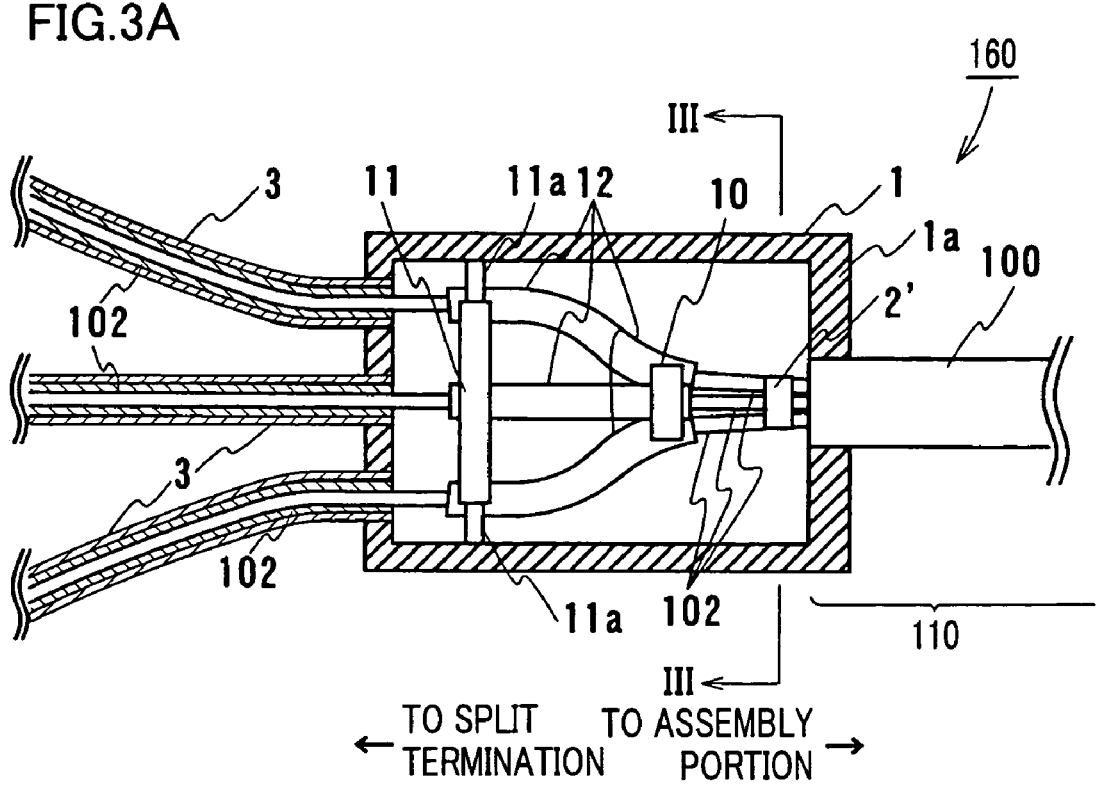
FIG. 3A schematically shows a phase split structure of a multiphase superconducting cable of the present invention that has an electrically-conductive connecting portion located relatively closer to an assembly portion.
Figure 3B:
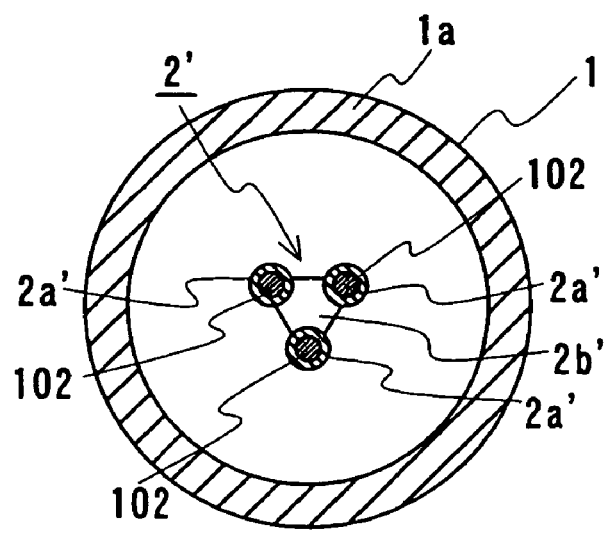
FIG. 3B is a cross-sectional view along line III-III in FIG. 3A.

Referring to FIGS. 3A and 3B, a phase split structure 160 of a multiphase superconducting cable in this embodiment is basically similar in structure to phase split structure 150 of the multiphase superconducting cable in the first embodiment shown in FIG. 1, and differs therefrom in that an electrically-conductive connecting portion 2' is provided relatively closer to assembly portion 110 with respect to second holding tool 11, which is described in detail below. Here, the terminal portions are not shown in FIG. 3A.

Conductive connecting portion 2' of the second embodiment includes, as shown in FIG. 3B, cylindrical members 2a' covering respective peripheries of shield layers respectively of a plurality of cable cores 102 as well as a coupling member 2b' coupling these cylindrical members 2a' to each other. Cylindrical members 2a' of this embodiment, like those of the first embodiment, are each formed of a pair of semi-arc members of copper. Semi-arc members of cylindrical member 2a' are provided around a corresponding shield layer exposed by partially removing protection layer 204 of cable core 102 and are connected with bolts to cover cable core 102. Cylindrical members 2a' are each connected to corresponding one of shield layers 203 of respective cable cores 102 with solder.

Coupling member 2b' in this embodiment connects these cylindrical members 2a' to each other and is provided between cable cores 102. Coupling member 2b' is formed of a triangular-prism-shaped material having its parts corresponding to respective apexes of the triangular cross section that are each cut out in the shape of an arc, and made of copper as cylindrical members 2a'. In this embodiment, the cut-out parts of coupling member 2b' are each connected with corresponding one of cylindrical members 2a' to form conductive connecting portion 2' having a triangular cross section with respective apexes on which cylindrical members 2a' are provided as shown in FIG. 3B (Δ connection type). Although coupling member 2b' and cylindrical members 2a' are connected with solder in this embodiment, they may be connected with such coupling members as bolts.

Phase split structure 160 of the superconducting cable structured as described above has electrically-conductive connecting portion 2' which connects respective shield layers of a plurality of cable cores 102 to each other, so that the connection resistance between the shield layers can be lowered when current is flown through the cable, as accomplished by the first embodiment. Accordingly, the magnitude of current flowing through the shield layers each is made substantially equal to the magnitude of current flowing through each of the superconductors, and thus a magnetic field generated from the superconductors can be cancelled out by the magnetic field generated in the shield layers. In this way, occurrence of a large magnetic field outside the cable cores can be reduced.

Further, since electrically-conductive connecting portion 2' of this embodiment is provided relatively closer to assembly portion 110, the distance between cable cores 102 is relatively shorter. Then, conductive connecting portion 2' can be made small and the space located relatively closer to the split termination with respect to second holding tool 11 in splitter box 1 can be made smaller. In this way, splitter box 1 can be made compact.

Third Embodiment

Referring to FIGS. 1 and 3A, the first and second embodiments have been described in connection with the structure having thermal insulation pipe 3 of stainless, which is a high-resistance material, provided around the periphery of each of cable cores 102 extending from splitter box 1. In this embodiment, thermal insulation pipe 3 is made of an insulation material of FRP (Fiber Reinforced Plastics). With the phase split structure of the superconducting cable of this embodiment, even if a leakage magnetic field is generated around cable cores 102 in the region from conductive connecting portion 2, 2' to the terminal portions (see FIG. 1), it is unlikely that eddy current occurs since thermal insulation pipes 3 provided around respective peripheries of cable cores 102 extending from the splitter box are made of the insulation material. Any loss due to the eddy current can thus be reduced more effectively.

As heretofore discussed, with the phase split structure of the present invention, respective shield layers of a plurality of cable cores are connected to each other with the electrically-conductive connecting portion at the portion where the cable is split into respective cable-core segments. Accordingly, generation of a large magnetic field outside the cable cores can effectively be reduced.

Moreover, since the thermal insulation pipes of a high-resistance material or insulation material are provided around respective peripheries of the cable cores at the region relatively closer to the split termination, occurrence of eddy current can be reduced or minimized even if any leakage magnetic field is generated around respective portions of cable cores that are located between the split termination and the conductive connecting portion. Any loss due to the eddy current can thus be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A phase split structure of a multiphase superconducting cable, comprising:
   a plurality of cable cores having respective shield layers provided around respective superconductors, said shield layers each formed of a plurality of superconducting strands;
   a splitter box housing said plurality of cable cores extending from an assembly portion in which said cable cores are assembled into the superconducting cable, said cable cores in said splitter box being spaced apart from each other;
   an electrically-conductive connecting portion connecting respective shield layers of said plurality of cable cores to each other in said splitter box; and
   a holding tool separate from the splitter box and located within an interior of the splitter box housing and attached to the splitter box, for holding each of said plurality of cable cores at a constant distance with respect to each other for a portion of each of the cable cores that extends between the holding tool and a location in the splitter box where the cable cores exit the splitter box housing.

2. The phase split structure of the multiphase superconducting cable according to claim 1, wherein
   said electrically-conductive connecting portion has cylindrical members covering respective peripheries of said shield layers of said plurality of cable cores and a coupling member coupling said cylindrical members to each other.

3. The phase split structure of the multiphase superconducting cable according to claim 2, wherein
   said coupling member is formed of a braided material.

4. The phase split structure of the multiphase superconducting cable according to claim 1, wherein
   said electrically-conductive connecting portion is provided closer to a split termination of said cable cores within said splitter box.

5. The phase split structure of the multiphase superconducting cable according to claim 1, wherein said electrically-conductive connecting portion is provided closer to said assembly portion of said cable cores within said splitter box.

6. The phase split structure of the multiphase superconducting cable according to claim 1, wherein
a thermal insulation pipe is provided around the periphery of each of said plurality of cable cores drawn out of said splitter box, and said thermal insulation pipe is formed of a high-resistance material or insulation material.

7. The phase split structure of the multiphase superconducting cable according to claim 1, wherein the holding tool is moveabley attached to the interior of the splitter box.

8. The phase split structure of the multiphase superconducting cable according to claim 1, wherein the holding tool contacts the interior of the splitter box.

9. The phase split structure of the multiphase superconducting cable according to claim 1, wherein the holding tool is slidably attached to the interior of the splitter box.

10. The phase split structure of the multiphase superconducting cable according to claim 1, wherein the holding tool is in moveable contact with the interior of the splitter box.

* * * * *